US010963968B1

(12) United States Patent
Tofte et al.

(10) Patent No.: US 10,963,968 B1
(45) Date of Patent: \*Mar. 30, 2021

(54) UNMANNED AERIAL VEHICLE (UAV) DATA COLLECTION AND CLAIM PRE-GENERATION FOR INSURED APPROVAL

(71) Applicant: State Farm Mutual Automobile Insurance Company, Bloomington, IL (US)

(72) Inventors: Nathan L Tofte, Downs, IL (US); Timothy W Ryan, Hudson, IL (US); Nathan W Baumann, Bloomington, IL (US); Michael Shawn Jacob, Le Roy, IL (US); Joshua David Lillie, Bloomington, IL (US); Brian N Harvey, Bloomington, IL (US); Roxane Lyons, Chenoa, IL (US); Rosemarie Geier Grant, Ellsworth, IL (US)

(73) Assignee: State Farm Mutual Automobile Insurance Company, Bloomington, IL (US)

( \* ) Notice: Subject to any disclaimer, the term of this patent is extended or adjusted under 35 U.S.C. 154(b) by 7 days.

This patent is subject to a terminal disclaimer.

(21) Appl. No.: 16/178,793

(22) Filed: Nov. 2, 2018

Related U.S. Application Data

(63) Continuation of application No. 14/858,073, filed on Sep. 18, 2015, now Pat. No. 10,163,164.

(Continued)

(51) Int. Cl.
*B64D 47/08* (2006.01)
*B64C 39/02* (2006.01)
*G06Q 40/08* (2012.01)

(52) U.S. Cl.
CPC ............ *G06Q 40/08* (2013.01); *B64C 39/024* (2013.01); *B64D 47/08* (2013.01); *B64C 2201/12* (2013.01); *B64C 2201/127* (2013.01)

(58) Field of Classification Search
CPC ........ G06Q 40/08; G06Q 40/00; B64D 47/08; B64C 39/024; B64C 2201/12; B64C 2201/127
See application file for complete search history.

(56) References Cited

U.S. PATENT DOCUMENTS

| 5,686,892 A | 11/1997 | Smith |
| 6,056,237 A | 5/2000 | Woodland |

(Continued)

FOREIGN PATENT DOCUMENTS

WO 2015/158265 A1 10/2015

OTHER PUBLICATIONS

Office Action issued in U.S. Appl. No. 14/858,034 dated Apr. 3, 2018.

(Continued)

*Primary Examiner* — Elda G Milef

(57) ABSTRACT

Systems and methods are described for using data collected by unmanned aerial vehicles (UAVs) to generate insurance claim estimates that an insured individual may quickly review, approve, or modify. When an insurance-related event occurs, such as a vehicle collision, crash, or disaster, one or more UAVs are dispatched to the scene of the event to collect various data, including data related to vehicle or real property (insured asset) damage. With the insured's permission or consent, the data collected by the UAVs may then be analyzed to generate an estimated insurance claim for the insured. The estimated insurance claim may be sent to the insured individual, such as to their mobile device via wireless communication or data transmission, for subse- (Continued)

quent review and approval. As a result, insurance claim handling and/or the online customer experience may be enhanced.

19 Claims, 4 Drawing Sheets

Related U.S. Application Data

(60) Provisional application No. 62/209,963, filed on Aug. 26, 2015, provisional application No. 62/209,755, filed on Aug. 25, 2015, provisional application No. 62/209,627, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(56) References Cited

U.S. PATENT DOCUMENTS

| | | | |
|---|---|---|---|
| 6,166,729 A | 12/2000 | Acosta | |
| 7,053,823 B2 | 5/2006 | Cervinka et al. | |
| 7,480,715 B1 | 1/2009 | Barker | |
| 7,493,211 B2 | 2/2009 | Breen | |
| 7,809,587 B2 | 10/2010 | Dorai | |
| 7,889,931 B2 | 2/2011 | Webb | |
| 7,912,738 B1 | 3/2011 | Martin | |
| 7,953,615 B2 | 5/2011 | Aquila | |
| 8,019,629 B1 | 9/2011 | Medina et al. | |
| 8,069,869 B1 | 12/2011 | Huang | |
| 8,095,391 B2 | 1/2012 | Obora et al. | |
| 8,239,220 B2 | 8/2012 | Kidd | |
| 8,265,963 B1 | 9/2012 | Hanson | |
| 8,346,578 B1 | 1/2013 | Hopkins, III et al. | |
| 8,355,966 B1 | 1/2013 | Vu et al. | |
| 8,374,957 B1 | 2/2013 | Garcia | |
| 8,401,878 B2 | 3/2013 | Stender et al. | |
| 8,527,305 B1 | 9/2013 | Hanson | |
| 8,537,338 B1 | 9/2013 | Medasani | |
| 8,543,486 B2 | 9/2013 | Donoho | |
| 8,630,820 B2 | 1/2014 | Amis | |
| 8,650,106 B1 | 2/2014 | Hopkins, III | |
| 8,700,434 B1 | 4/2014 | DeLong et al. | |
| 8,712,893 B1 | 4/2014 | Brandmaier et al. | |
| 8,756,085 B1 | 6/2014 | Tofte et al. | |
| 8,788,127 B1 | 7/2014 | Waldo et al. | |
| 8,799,034 B1 | 8/2014 | Brandmaier et al. | |
| 8,818,572 B1 | 8/2014 | Tofte et al. | |
| 8,872,818 B2 | 10/2014 | Freeman et al. | |
| 8,909,391 B1 | 12/2014 | Peeters et al. | |
| 8,930,044 B1 | 1/2015 | Peeters et al. | |
| 8,948,935 B1 | 2/2015 | Peeters et al. | |
| 8,970,400 B2 | 3/2015 | Verna et al. | |
| 8,983,682 B1 | 3/2015 | Peeters et al. | |
| 9,019,092 B1 | 4/2015 | Brandmaier et al. | |
| 9,020,536 B1 | 4/2015 | Crossno et al. | |
| 9,051,043 B1 | 6/2015 | Peeters et al. | |
| 9,069,869 B1 | 6/2015 | Quinn et al. | |
| 9,082,015 B2 | 7/2015 | Christopulos et al. | |
| 9,129,355 B1 | 9/2015 | Harvey et al. | |
| 9,131,224 B1 | 9/2015 | Freeman et al. | |
| 9,159,132 B1 | 10/2015 | Crowsey | |
| 9,307,383 B1 | 4/2016 | Patrick | |
| 9,443,207 B2 | 9/2016 | Przybylko et al. | |
| 9,505,494 B1 | 11/2016 | Marlow et al. | |
| 9,536,148 B2 | 1/2017 | Gross | |
| 9,563,201 B1 | 2/2017 | Tofte et al. | |
| 9,612,598 B2 | 4/2017 | Schultz et al. | |
| 9,646,283 B2 | 5/2017 | Kantor et al. | |
| 9,665,094 B1 | 5/2017 | Russell | |
| 9,691,103 B1 | 6/2017 | Hopkins, III | |
| 9,754,325 B1 | 9/2017 | Konrardy et al. | |
| 9,792,656 B1 | 10/2017 | Konrardy et al. | |
| 9,824,397 B1 | 11/2017 | Patel et al. | |
| 9,846,915 B2 | 12/2017 | Howe et al. | |
| 9,852,487 B1 | 12/2017 | Farnsworth et al. | |
| 9,870,609 B2 | 1/2018 | Kompalli et al. | |
| 9,875,509 B1 | 1/2018 | Harvey et al. | |
| 9,894,327 B1 | 2/2018 | Jacob | |
| 9,928,553 B1 | 3/2018 | Harvey et al. | |
| 9,972,054 B1 | 5/2018 | Konrardy et al. | |
| 9,978,030 B2 | 5/2018 | Lim | |
| 10,102,584 B1 | 10/2018 | Devereaux et al. | |
| 10,102,586 B1 * | 10/2018 | Marlow | G06Q 40/08 |
| 10,163,162 B1 | 12/2018 | Devereaux et al. | |
| 10,275,834 B1 | 4/2019 | Tofte et al. | |
| 2002/0002475 A1 | 1/2002 | Freedman | |
| 2002/0007225 A1 | 1/2002 | Costello | |
| 2002/0055861 A1 | 5/2002 | King | |
| 2003/0046362 A1 | 3/2003 | Waugh et al. | |
| 2003/0069002 A1 | 4/2003 | Hunter et al. | |
| 2003/0154111 A1 | 8/2003 | Dutra | |
| 2004/0088198 A1 | 5/2004 | Childress | |
| 2004/0243423 A1 | 12/2004 | Rix | |
| 2005/0080649 A1 | 4/2005 | Alvarez | |
| 2005/0128074 A1 | 6/2005 | Culpepper et al. | |
| 2006/0071783 A1 | 4/2006 | Culpepper et al. | |
| 2006/0158328 A1 | 7/2006 | Culpepper et al. | |
| 2008/0091490 A1 | 4/2008 | Abrahams | |
| 2008/0159591 A1 | 7/2008 | Ruedin | |
| 2008/0224854 A1 | 9/2008 | Furey et al. | |
| 2008/0255887 A1 | 10/2008 | Gruter | |
| 2009/0002364 A1 | 1/2009 | Witte, II | |
| 2009/0027253 A1 | 1/2009 | van Tooren | |
| 2009/0055226 A1 | 2/2009 | Tritz | |
| 2009/0138290 A1 | 5/2009 | Holden | |
| 2009/0157437 A1 | 6/2009 | Becerra et al. | |
| 2009/0219393 A1 | 9/2009 | Vian et al. | |
| 2009/0265193 A1 | 10/2009 | Colllins et al. | |
| 2010/0012769 A1 | 1/2010 | Alber et al. | |
| 2010/0156816 A1 | 6/2010 | Relyea et al. | |
| 2010/0215212 A1 | 8/2010 | Flakes, Jr. | |
| 2010/0250022 A1 | 9/2010 | Hines | |
| 2010/0274606 A1 | 10/2010 | Fain et al. | |
| 2010/0302359 A1 | 12/2010 | Adams | |
| 2011/0046920 A1 | 2/2011 | Amis | |
| 2011/0130636 A1 | 6/2011 | Daniel et al. | |
| 2011/0137443 A1 | 6/2011 | Farahani | |
| 2011/0161118 A1 | 6/2011 | Borden | |
| 2012/0033821 A1 | 2/2012 | Ohta | |
| 2012/0033851 A1 | 2/2012 | Chen et al. | |
| 2012/0071998 A1 | 3/2012 | Davies | |
| 2012/0140041 A1 | 6/2012 | Burgund | |
| 2012/0170797 A1 | 7/2012 | Pershing et al. | |
| 2012/0210853 A1 | 8/2012 | Abershitz | |
| 2012/0250010 A1 | 10/2012 | Hannay | |
| 2012/0265698 A1 | 10/2012 | Kidd et al. | |
| 2012/0299751 A1 | 11/2012 | Verna et al. | |
| 2012/0303336 A1 | 11/2012 | Becker | |
| 2013/0033381 A1 | 2/2013 | Breed | |
| 2013/0033851 A1 | 2/2013 | Wang | |
| 2013/0216089 A1 | 8/2013 | Chen et al. | |
| 2013/0226624 A1 | 8/2013 | Blessman | |
| 2013/0317865 A1 | 11/2013 | Tofte et al. | |
| 2014/0019166 A1 | 1/2014 | Swanson et al. | |
| 2014/0058763 A1 | 2/2014 | Zizzamia | |
| 2014/0068413 A1 | 3/2014 | Christensen | |
| 2014/0100889 A1 | 4/2014 | Tofte | |
| 2014/0111332 A1 | 4/2014 | Przybylko et al. | |
| 2014/0132409 A1 | 5/2014 | Billman et al. | |
| 2014/0163852 A1 | 6/2014 | Borri | |
| 2014/0168420 A1 | 6/2014 | Naderhirn et al. | |
| 2014/0244078 A1 | 8/2014 | Downey | |
| 2014/0245210 A1 | 8/2014 | Battcher et al. | |
| 2014/0257862 A1 | 9/2014 | Billman et al. | |
| 2014/0288976 A1 | 9/2014 | Thomas et al. | |
| 2014/0316614 A1 | 10/2014 | Newman | |
| 2014/0320651 A1 | 10/2014 | McClathchie et al. | |
| 2014/0324405 A1 | 10/2014 | Plummer et al. | |
| 2014/0334684 A1 | 11/2014 | Strimling | |

(56) References Cited

U.S. PATENT DOCUMENTS

| | | |
|---|---|---|
| 2014/0336928 A1 | 11/2014 | Scott |
| 2014/0353422 A1 | 12/2014 | Westbrook, Sr. |
| 2014/0368378 A1 | 12/2014 | Crain et al. |
| 2015/0019267 A1 | 1/2015 | Prieto et al. |
| 2015/0020558 A1 | 1/2015 | Williams |
| 2015/0025914 A1 | 1/2015 | Lekas |
| 2015/0046194 A1 | 2/2015 | Waddell et al. |
| 2015/0105933 A1 | 4/2015 | Martin et al. |
| 2015/0140954 A1 | 5/2015 | Maier et al. |
| 2015/0161277 A1 | 6/2015 | Heller et al. |
| 2015/0245210 A1 | 8/2015 | Kwon et al. |
| 2015/0254738 A1 | 9/2015 | Wright, III |
| 2015/0323932 A1 | 11/2015 | Paduano et al. |
| 2015/0348204 A1 | 12/2015 | Daues |
| 2015/0363717 A1 | 12/2015 | Lim |
| 2016/0063642 A1 | 3/2016 | Luciani et al. |
| 2016/0071217 A1 | 3/2016 | Edwards et al. |
| 2016/0071379 A1 | 3/2016 | McKiel, Jr. |
| 2016/0088286 A1 | 3/2016 | Forsythe et al. |
| 2016/0111006 A1 | 4/2016 | Srivastava et al. |
| 2016/0189303 A1 | 6/2016 | Fuchs |
| 2016/0203694 A1 | 7/2016 | Hogasten et al. |
| 2016/0216711 A1 | 7/2016 | Srivastava et al. |
| 2017/0083979 A1 | 3/2017 | Winn et al. |
| 2017/0200259 A1 | 7/2017 | Yang et al. |
| 2017/0210451 A1 | 7/2017 | Oh |
| 2017/0352100 A1 | 12/2017 | Shreve et al. |
| 2018/0279105 A1 | 9/2018 | Huber et al. |

OTHER PUBLICATIONS

Office Action issued in U.S. Appl. No. 14/858,038 dated Mar. 29, 2018.
Office Action issued in U.S. Appl. No. 14/858,052 dated Jun. 15, 2018.
Office Action issued in U.S. Appl. No. 14/858,076 dated Dec. 28, 2017.
Office Action issued in U.S. Appl. No. 14/858,076 dated Apr. 20, 2018.
U.S. Appl. No. 14/510,307, filed Oct. 9, 2014.
U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/858,038, filed Sep. 18, 2015.
U.S. Appl. No. 14/858,052, filed Sep. 18, 2015.
U.S. Appl. No. 14/858,058, filed Sep. 18, 2015.
U.S. Appl. No. 14/510,502, filed Oct. 9, 2014.
U.S. Appl. No. 14/858,034, filed Sep. 18, 2015.
U.S. Appl. No. 14/858,699, filed Sep. 18, 2015.
U.S. Appl. No. 14/858,076, filed Sep. 18, 2015.
U.S. Appl. No. 14/824,859, filed Aug. 12, 2015.
U.S. Appl. No. 14/858,075, filed Sep. 18, 2015.
U.S. Appl. No. 14/858,073, filed Sep. 18, 2015.
Office Action issued in U.S. Appl. No. 16/045,851 dated Sep. 4, 2018.
Office Action issued in U.S. Appl. No. 14/585,034 dated May 30, 2019.
Office Action issued in U.S. Appl. No. 14/858,034 dated Dec. 14, 2018.
Office Action issued in U.S. Appl. No. 14/858,034 dated Jul. 26, 2018.
Office Action issued in U.S. Appl. No. 14/858,052 dated Nov. 14, 2018.
Office Action issued in U.S. Appl. No. 14/858,058 dated Jan. 11, 2019.
Office Action issued in U.S. Appl. No. 14/858,073 dated Apr. 20, 2018.
Office Action issued in U.S. Appl. No. 14/858,075 dated Jan. 25, 2019.
Office Action issued in U.S. Appl. No. 14/858,699 dated Dec. 31, 2018.
Sorcher, Sara, "What Drones Can Do for You", National Journal; Washington, Apr. 11, 2013, pp. 1-4. (Year: 2013).
Ying Liu, Xiaozhong Li, Dan Wang, Lixin Cui, The bounds of premium and a fuzzy insurance model under risk aversion utility preference, Jul. 1, 2017, 2017 13th International Conference on Natural Computation, Fuzzy Systems and Knowledge Discovery ( ICNC-FSKD) (pp. 1357-1362). (Year: 2017).
Frey, Thomas. "192 Future Uses for Flying Drones" Business Trends. Sep. 2, 2014; p. 14 (111.Insurance Adjuster Drones) https://futuristspeaker.com/business-trends/192-future-uses-for-flying-drones/ (Year: 2014).
How Do Body Shops Estimates Affect Car Insurance Claims?. Car Insurance Quotes.com. Aug. 19, 2013 (2 pages). (Year: 2013).
Costonis, Michael A. "Better Insurer Service Can Reduce Consumer Tolerance Schemes." Journal of Insurance Fraud in America. Fall 2011. (Year: 2011).
Samadzadegan, N; Zarrinpanjeh. N, "Earthquake Destruction Assessment of Urban Roads Network Using Satellite Imagery and Fuzzy Inference Systems", The International Archives of the Photogrammetry; Remote Sensing and Spatial Information Sciences, vol. xxxvii, p. B8, Beijing, pp. 1-6. (Year: 2008).
Yamzaki, F, "Applications of remote sensing and GIS for damage assessment", Earthquake Disaster Mitigation Research Center, NIED, Hyogo, Japan Institute of Industrial Science, University of Tokyo, Tokyo, Japan, pp. 1-12. (Year: 2001).

* cited by examiner

UNMANNED AERIAL VEHICLE (UAV) DATA COLLECTION AND CLAIM PRE-GENERATION FOR INSURED APPROVAL

CROSS REFERENCE TO RELATED APPLICATIONS

This application is a continuation of, and claims the benefit of, U.S. patent application Ser. No. 14/858,073, entitled "Unmanned Aerial Vehicle (UAV) Data Collection & Claim Pre-generation for Insured Approval" and filed Sep. 18, 2015, which claims the benefit of (1) U.S. Provisional Patent Application No. 62/053,519, entitled "METHOD OF IMPLEMENTING UNMANNED AERIAL VEHICLES (UAVS)," filed Sep. 22, 2014, (2) U.S. Provisional Patent Application No. 62/209,963, entitled "DISASTER DAMAGE ANALYSIS AND LOSS MITIGATION IMPLEMENTING UNMANNED AERIAL VEHICLES (UAVS)," filed Aug. 26, 2015, (3) U.S. Provisional Patent Application No. 62/207,421 entitled "INSURANCE UNDERWRITING AND RE-UNDERWRITING IMPLEMENTING UNMANNED AERIAL VEHICLES (UAVS)," filed Aug. 20, 2015, (4) U.S. Provisional Patent Application No. 62/207,127 entitled "ACCIDENT RECONSTRUCTION IMPLEMENTING UNMANNED AERIAL VEHICLES (UAVS)," filed Aug. 19, 2015, (5) U.S. Provisional Patent Application No. 62/209,755 entitled "SYSTEMS AND METHODS OF UTILIZING UNMANNED AERIAL VEHICLES TO DETECT INSURANCE CLAIM BUILDUP," filed Aug. 25, 2015, (6) U.S. Provisional Patent Application No. 62/209,627 entitled "SYSTEMS AND METHODS FOR USING DATA COLLECTED FROM UNMANNED AERIAL VEHICLES TO PRE-GENERATE CLAIMS FOR INSURED APPROVAL," filed Aug. 25, 2015, and (7) U.S. Provisional Patent Application No. 62/208,201 entitled "LOSS MITIGATION IMPLEMENTING UNMANNED AERIAL VEHICLES (UAVS)," filed Aug. 21, 2015, the disclosure of each of which is hereby expressly incorporated by reference herein in its entirety.

This application is also related to U.S. patent application Ser. No. 14/824,859 entitled "ACCIDENT FAULT DETERMINATION IMPLEMENTING UNMANNED AERIAL VEHICLES (UAVS)," filed Aug. 12, 2015, the disclosure of which is hereby expressly incorporated by reference herein in its entirety.

FIELD OF THE DISCLOSURE

The present application generally relates to insurance and, more particularly, to systems and methods for using data collected from unmanned aerial vehicles (UAVs) or drones to pre-generate claims for insured approval.

BACKGROUND

Conventionally, filing claims for an insurance-related event may be a time-consuming process that requires a large component of human intervention. For example, to file a vehicle claim, various data collection activities must be performed, such as speaking with witnesses, visiting the scene of a vehicle collision, crash, or disaster, examining vehicle damages, etc. These actions usually require a great deal of time, effort, and cost when performed by a person.

SUMMARY

In one aspect, a computer-implemented method of using drone data to pre-generate insurance claims may be provided. The method may include receiving, via a network, drone data from one or more UAVs. The drone data may include one or more of image data, video data, or audio data associated with an insurance-related event in which damage is incurred on an insured asset. The method may also include analyzing, by one or more processors, the drone data to estimate an extent of damage incurred on the insured asset. The method may further include generating, by one or more processors, an estimated insurance claim for the insured asset based upon the estimated extent of damage incurred on the insured asset. Additionally, the method may include transmitting, via a network, the estimated insurance claim to an owner of the insured asset (such as to a mobile device of the owner via wireless communication or data transmission) for review and approval of the estimated insurance claim. The method may include additional, fewer, or alternate actions, including those discussed elsewhere herein.

In another aspect, a non-transitory computer-readable storage medium including computer-readable instructions to be executed on one or more processors of a system for using drone data to pre-generate insurance claims may be provided. The instructions when executed may cause the one or more processors to receive, via a network, drone data from one or more UAVs. The drone data may include one or more of image data, video data, or audio data associated with an insurance-related event in which damage is incurred on an insured asset. The instructions when executed may also cause the one or more processors to analyze the drone data to estimate an extent of damage incurred on the insured asset. The instructions when executed may further cause the one or more processors to generate an estimated insurance claim for the insured asset based upon the estimated extent of damage incurred on the insured asset. Additionally, the instructions when executed may cause the one or more processors to transmit, via a network, the estimated insurance claim to a mobile device of an owner of the insured asset for review and approval of the estimated insurance claim. The non-transitory computer-readable storage memory may include additional, fewer, or alternate computer-readable instructions, including those discussed elsewhere herein.

In another aspect, a computer system for using drone data to pre-generate insurance claims may be provided. The computer system may include a data repository and a server including a memory having instructions for execution on one or more processors. The instructions, when executed by the one or more processors, may cause the server to receive, via a network, drone data from one or more UAVs. The drone data may include one or more of image data, video data, or audio data associated with an insurance-related event in which damage is incurred on an insured asset. The instructions, when executed by the one or more processors, may also cause the server to store the drone data in the data repository. Further, the instructions, when executed by the one or more processors, may cause the server to analyze the drone data in the data repository to estimate an extent of damage incurred on the insured asset. Still further, the instructions, when executed by the one or more processors, may cause the server to generate an estimated insurance claim for the insured asset based upon the estimated extent of damage incurred on the insured asset. Additionally, the instructions, when executed by the one or more processors, may cause the server to transmit, via a network, the estimated insurance claim to mobile or other computing device of an owner of the insured asset for their review and approval of the estimated insurance claim. The computer system may include additional, fewer, or alternate instructions for execution on the one or more processors, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

Figure 1:
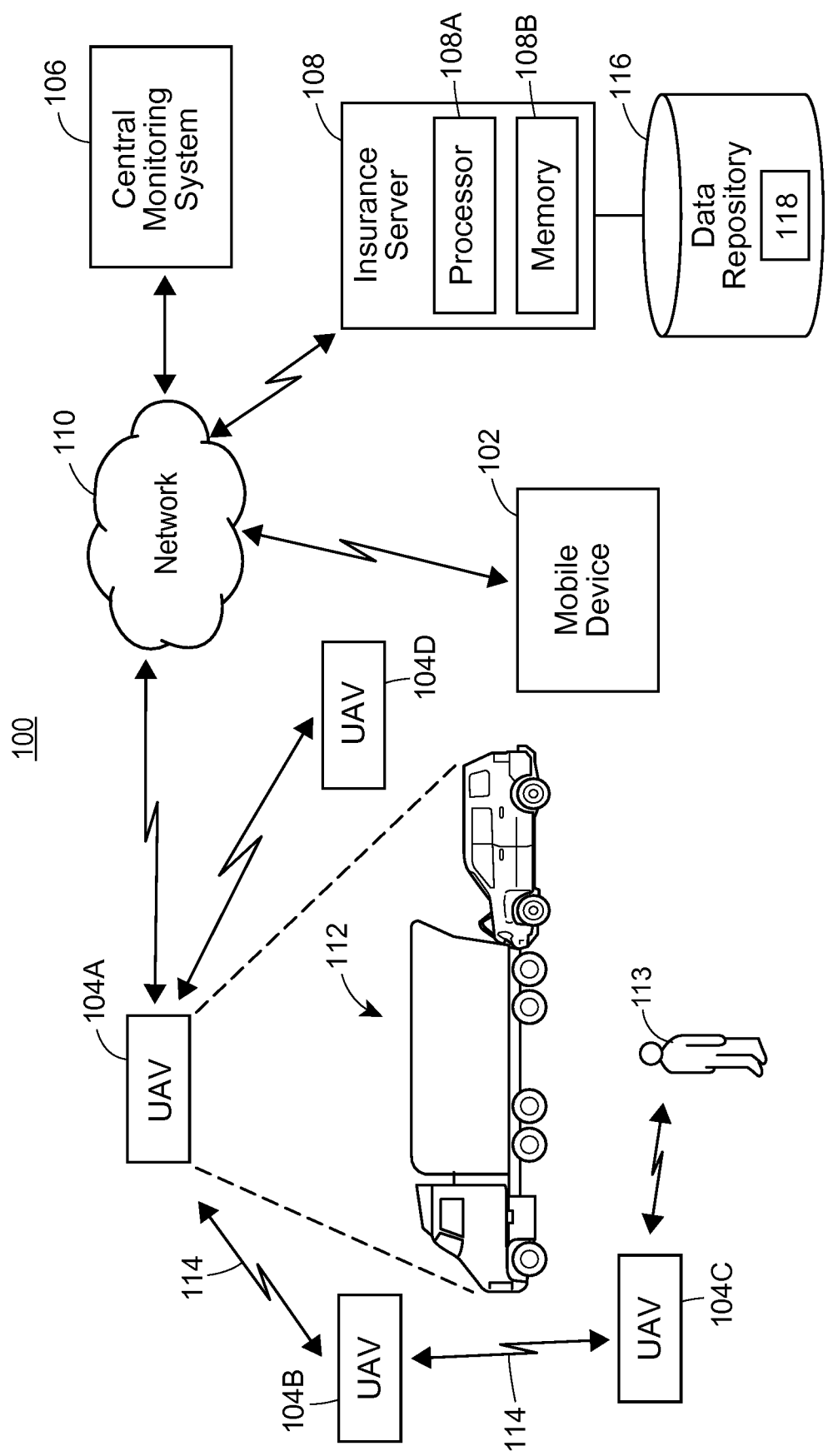
FIG. 1 is a block diagram of an exemplary system for using data collected from UAVs to pre-generate claims for insured approval.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods disclosed herein generally relate to, inter alia, using data collected by UAVs or drones to generate insurance claim estimates that an insured individual may quickly review, approve, or modify. More particularly, when an insurance-related event occurs, one or more UAVs are dispatched to the scene of the event to automatically collect all relevant data. The collected data is then analyzed to generate an estimated insurance claim, which is sent to the insured individual for subsequent review and/or approval.

In one aspect, the systems and methods disclosed herein may perform the following actions: (1) receive image, audio, and/or other drone data, at or via a remote server (and/or one or more remote processors) associated with an insurance provider, from one or more drones (or drone transceivers) via wireless communication or data transmission, the received drone data recording, showing, capturing, detailing, or otherwise being associated with a scene of a vehicle collision, crash, or disaster and/or being generated, captured, collected, or gathered by the one or more drones (and/or associated drone sensors, cameras, imaging devices, audio or visual recording devices, and/or other drone-mounted electronic devices) before, during, and/or after the vehicle collision, crash, or disaster, the vehicle collision, crash, or disaster involving an insured driver or vehicle covered by an insurance policy issued by the insurance provider; (2) analyze, at or via the remote server, the received drone data to estimate an extent of vehicle damage and/or passenger injuries caused by the vehicle collision, crash, or disaster; (3) generate, at or via the remote server, an estimated insurance claim for the vehicle collision, crash, or disaster based upon the estimated extent of vehicle damage and/or passenger injuries determined from analysis of the drone data; and/or (4) transmit the estimated insurance claim, via wireless communication or data transmission, from the remote server to a mobile or other computing device associated with the insured driver or an owner of the insured vehicle to facilitate their review, approval, and/or modification of the estimated insurance claim and quicker claim handling.

Additionally or alternatively, the systems and methods may adjust or update, at or via the remote server, a premium, rate, reward, or discount for the insurance policy of the insured driver or vehicle based upon the estimated insurance claim; and/or accept or receive, at or via the remote server, approval of, or modification to, the estimated insurance claim from the insured driver or owner of the insured vehicle that is sent from their mobile or other computing device.

In another aspect, the systems and methods disclosed herein may perform the following actions: (1) receive image, audio, and/or other drone data, at or via a remote server (and/or one or more remote processors) associated with an insurance provider, from one or more drones (or drone transceivers) via wireless communication or data transmission, the received drone data recording, showing, capturing, detailing, or otherwise being associated with an insured asset and being generated, captured, collected, or gathered by the one or more drones (and/or associated drone sensors, cameras, imaging devices, audio or visual recording devices, and/or other drone-mounted electronic devices) before, during, and/or after an insurance-related event, the insured asset covered by an insurance policy issued by the insurance provider; (2) analyze, at or via the remote server, the received drone data to estimate an extent of damage to the insured asset incurred as a result of the insurance-related event; (3) generate, at or via the remote server, an estimated insurance claim for the insured asset based upon the estimated extent of damage to the insured asset that is caused by the insurance-related event as determined from analysis of the drone data; and/or (4) transmit the estimated insurance claim via wireless communication or data transmission from the remote server to a mobile or other computing device associated with the insured or an owner of the insured asset to facilitate their review, approval, and/or modification of the estimated insurance claim and quicker claim handling.

Additionally or alternatively, the systems and methods may adjust or update, at or via the remote server, a premium, rate, reward, or discount for the insurance policy of the insured or for the insured asset based upon the estimated insurance claim; and/or accept or receive, at or via the remote server, approval of, or modification to, the estimated insurance claim from the insured or owner of the insured asset that is sent from their mobile or other computing device.

The insurance-related event may be a vehicle collision, vehicle crash, vehicle disaster, hurricane, tornado, thunderstorm, windstorm, ice storm, earthquake, and/or hailstorm, and/or the insured asset may be a vehicle, home, boat, real property, and/or other property. The damage to the insured asset may be wind, water, and/or fire damage, and the insured asset may be an insured home, real property, vehicle, and/or other property.

I. Exemplary System for Using Data Collected from UAVs to Pre-Generate Claims for Insured Approval FIG. 1 depicts a block diagram of an exemplary system 100 for using data collected from UAVs to pre-generate claims for insured approval. The exemplary system 100 may include a mobile device 102, UAVs 104A-104D, a central monitoring system 106, and an insurance server 108, all communicating via a communication network 110, which may include wired and/or wireless links.

Generally speaking, the UAVs 104A-104D may be any suitable type of UAV (e.g., quadracopters, flying wings, drones, etc.). As such, the UAVs 104A-104D may be equipped with any suitable number of propellers, wings, and/or engines to facilitate sustained flight, maneuvering, and/or the execution of various tasks as further discussed herein. Further, the UAVs 104A-104D may utilize any suitable type of navigation and/or maneuvering control, such as collision-avoidance systems, detect-and-avoid systems, etc. Moreover, while FIG. 1 shows only four UAVs, the system 100 in general may include any number of suitable UAVs.

The UAVs 104A-104D may be configured to collect data associated with an insurance-related event 112. In general, the insurance-related event 112 may be any incident in which damages are incurred on an insured asset. For example, if the insured asset is a vehicle, a motorcycle, a truck, a boat, etc., then the damages to the insured asset may be losses related to a collision, crash, or may be the result of a disaster. As another example, the insured asset may be a home, a real property, and/or other property. As such, the damages to the insured asset may be in the form of wind damages, water damages, fire damages, theft damages, hail damages, earthquake damages, etc. Other examples of the insurance-related event 112 may include weather conditions or natural disasters (e.g., hurricanes, tornados, thunderstorms, windstorms, hailstorms, earthquakes, ice storms, etc.) that may cause or result in damages to one or more insured assets.

As an illustrative example, FIG. 1 shows the insurance-related event 112 as an event involving a vehicle collision or crash. As such, the UAVs 104A-104D may perform data collection activities related to the vehicle collision or crash 112. For example, one or more of the UAVs 104A-104D may provide a live recording of the collision or crash scene, take aerial photographs, collect video and audio data, collect driver and vehicle information, download telematics data from the vehicle, etc. Further, the UAVs 104A-104D may interact with individuals 113 (e.g., drivers, passengers, witnesses, police, public safety personnel, etc.) to collect relevant data and information regarding the vehicle collision or crash 112.

The UAVs 104A-104D may communicate with each another to perform various activities including those related to data collection. The UAVs 104A-104D may communicate with one another via the network 110. Alternatively or additionally, the UAVs 104A-104D may communicate with one another via wireless links 114. In one aspect, one or more of the UAVs 104A-104D may communicate with one another to perform tasks as an intelligent group, thereby acting as and communicating with one another as a drone swarm. In another aspect, one or more of the UAVs 104A-104D may be controlled individually by other UAVs 104. For example, one or more of the UAVs 104A-104D may receive commands from other UAVs 104, process the commands, and execute one or more actions based upon the received commands. Individual control of one or more of the UAVs 104A-104D may be implemented, for example, via a unique UAV address, a unique frequency channel, a unique code (e.g., a pseudo noise code or a pseudo random noise code), etc.

Additionally, the central monitoring system 106 may be used to communicate with, command, and/or control one or more of the UAVs 104A-104D. The central monitoring system 106 may be implemented as one or more desktop computers, laptop computers, smartphones, or any other computing devices capable of transmitting data to and receiving data from the UAVs 104A-104D. The central monitoring system 106 may operate to dispatch one or more of the UAVs 104A-104D, to command one or more of the UAVs 104A-104D to perform tasks, to navigate one or more of the UAVs 104A-104D to a specific geographic location, etc.

In one aspect, the central monitoring system 106 may be configured to communicate with the UAVs 104A-104D individually. In another aspect, the central monitoring system 106 may be configured to communicate with the UAVs 104A-104D in a hierarchical fashion. For example, the central monitoring system 106 may communicate with a "mothership" UAV (one of the UAVs 104A-104D), which then communicates with other UAVs. Generally, the central monitoring system 106 may operate automatically or semi-automatically with no user intervention or minimal user intervention. Alternatively or additionally, the central monitoring system 106 may be staffed with personnel trained to command, control, and/or communicate with one or more of the UAVs 104A-104D based upon a particular scenario or application.

In operation, the central monitoring system 106 may receive a report indicating the occurrence of an insurance-related event, such as the vehicle collision or crash 112. For example, an insured individual (e.g., a driver or owner of the vehicle involved in the collision or crash) may report the collision or crash to the central monitoring system 106. The insured individual may do so by using the mobile device 102, which may be, for example, a smartphone, a tablet, a wearable device, etc. Once received, the central monitoring system 106 may dispatch one or more of the UAVs 104A-104D to the scene of the vehicle collision or crash 112 to collect data related to the collision or crash. The data collected by the UAVs 104A-104D may then be sent to the insurance server 108 for the purpose of generating estimated insurance claims.

Generally, the insurance server 108 may be part of an insurance provider's computing system. The insurance server 108 may include a processor 108A, a memory 108B, and a data repository 116. Data received by the server 108 from the UAVs 104A-104D may be stored in the repository 116 as drone data 118. While FIG. 1 shows the repository 116 as directly coupled to the insurance server 108, in other embodiments, the repository 116 may not be directly coupled to the server 108 but instead may be accessible by the server 108 via a network such as the network 110.

The processor 108A of the insurance server 108 may execute instructions stored in the memory 108B to retrieve the drone data 118 in the repository 116 and then utilize the drone data 118 to generate claim estimates. In other words, the insurance server 108 may analyze the drone data 118 to produce one or more estimated insurance claims associated with the insurance-related event captured or monitored by the UAVs 104A-104D. The estimated claims may then be sent to the insured individual (via the mobile device 102) for his or her review, approval, and/or modification. In this manner, the process of collecting information to generate estimated claims for approval by the insured individual may be made quicker, more efficient and more cost-effective.

II. Exemplary UAV

Figure 2:
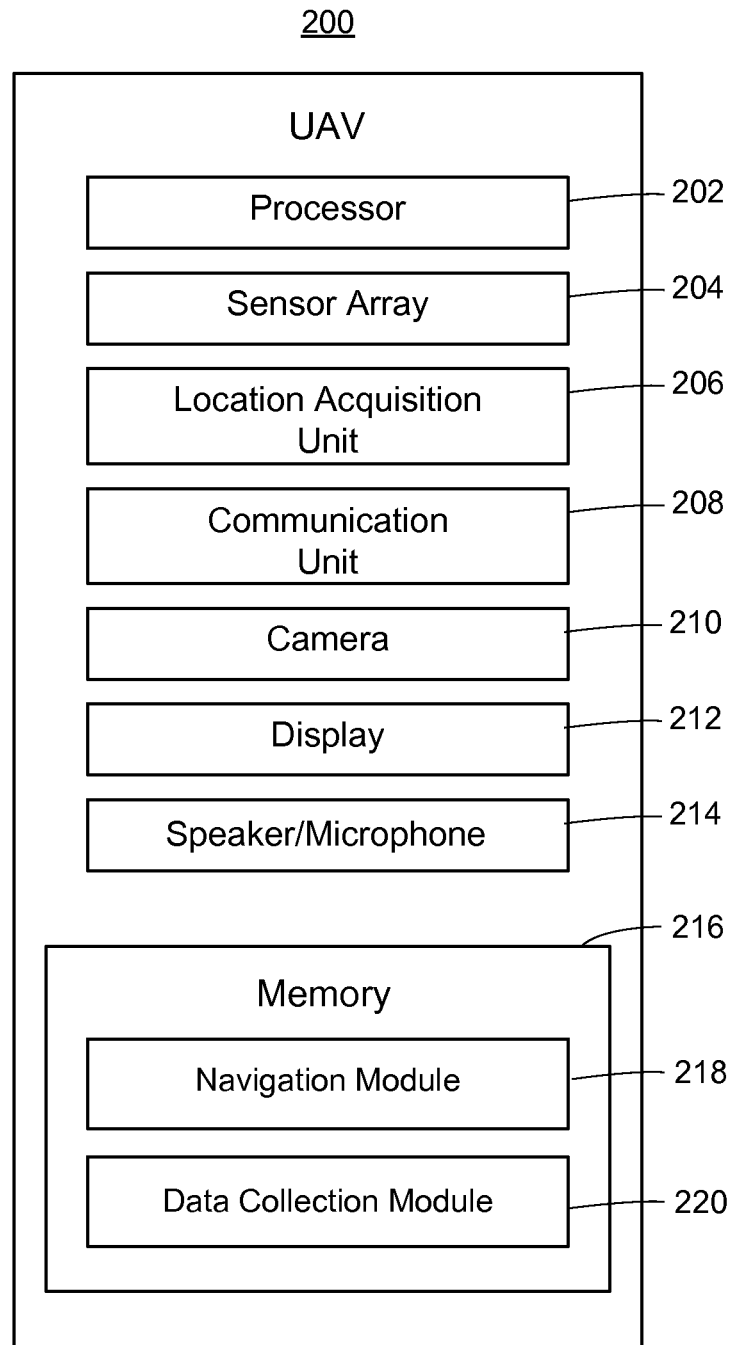
FIG. 2 is a block diagram of an exemplary UAV.

FIG. 2 depicts a block diagram of an exemplary UAV 200. The UAV 200 may include a processor 202, a sensor array 204, a location acquisition unit 206, a communication unit 208, a camera 210, a display 212, a speaker/microphone 214, and a memory 216 having a navigation module 218 and a data collection module 220. In one aspect, the UAV 200 is an implementation of one of the UAVs 104A-104D shown in FIG. 1.

The processor 202 may be implemented as any suitable type and/or number of processors. For example, the processor 202 may be implemented as an embedded processor, a central processing unit, a graphical processing unit, etc. The processor 202 may be configured to communicate with the other components 204-216 of the UAV 200 via one or more wired and/or wireless interconnections. Further, the processor 202 may be configured to operate in conjunction with one or more of the other components 204-216. For example, the processor 202 may operate in conjunction with the sensor array 204 to receive, process, store, and/or interpret data measured and/or generated via the sensor array 204. As another example, the processor 202 may operate in conjunction with the display 212 to cause alerts and/or notifications to be displayed via the display 212. As a further example, the processor 202 may operate in conjunction with the communication unit 208 to interpret communications, commands, and/or controls received via communication unit 208.

The sensor array 204 may be implemented as any suitable number and/or type of sensors. Examples of the type of sensors implemented by the sensor array 204 may include one or more accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, camera, etc. The sensor array 204 may additionally or alternatively include advanced sensors that detect and/or receive data associated with temperature measurements, thermal imaging, weather conditions, traffic conditions, etc. The sensor array 204 may be configured to collect information in accordance with any of the implemented sensors, to store the collected information in the memory 216, and/or to transmit any of the collected information to one or more of the central monitoring system 106, another UAV (e.g., one or more of the UAVs 104A-104D), and/or the insurance server 108.

Noted above, in one embodiment, the sensors may include one or more cameras. The one or more cameras, and/or images taken by such cameras, may be used for drone or UAV location determination and/or navigation. For instance, images acquired by drone mounted cameras may be used with known map-matching techniques to facilitate directing the drone along a pre-determined route, such as a route to the location of an insurance-related event or disaster, or back to a "base" location. Additionally or alternatively, drone or UAV navigation may be aided by either a 2D (two dimensional) or 3D (three dimensional) model created from one or more drone mounted cameras, range finders, etc. (and/or data or images captured or created by such cameras or range finders). The 2D or 3D model may facilitate or allow a drone or UAV to avoid obstacles, such as power lines, trees, street signs, etc. during flight.

The location acquisition unit 206 may be implemented as a satellite navigation receiver that works with a global navigation satellite system (e.g., the global positioning system (GPS)). The location acquisition unit 206 may be configured to receive navigational signals from one or more satellites and to calculate a geographic location of the UAV 200 using these signals. The location acquisition unit 206 may include one or more processors, controllers, or other computing devices and memory to calculate the geographic location of the UAV 200 without the processor 202, or the location acquisition unit 206 may utilize components of the processor 202. Thus, the processor 202 and the location acquisition unit 206 may be combined or be separate or otherwise discrete elements.

Although aspects of the UAV 200 may include a satellite navigation receiver, any suitable location-determining technology may be used. For example, the communication unit 208 may determine the location of the UAV 200 by receiving data from transmitter locations and then performing basic triangulation calculations to determine the relative position of the UAV 200 with respect to the transmitting locations. For example, cellular towers or any customized transmitting radio frequency towers may be used instead of, or in addition to, satellites.

The communication unit 208 may be configured to support any suitable number and/or type of communication protocols to facilitate communications between the UAV 200 and one or more other devices, such as one or more of the central monitoring system 106, another UAV (e.g., one or more of the UAVs 104A-104D), the insurance server 108, and/or the mobile device 102 for example, as shown in FIG. 1. The communication unit 208 may be configured to send and receive data directly and/or indirectly (e.g., via the network 110). The communication unit 208 may be implemented with any suitable combination of hardware and/or software to facilitate this functionality. For example, the communication unit 208 may be implemented having any suitable number of wired and/or wireless transceivers, ports, connectors, antennas, etc.

The camera 210 may be configured to capture one or more digital images and/or video data. For example, the camera 210 may capture, store, and/or transmit images associated with the scene of vehicle collision or crash 112, such as images and/or videos of vehicles involved in the collision or crash, aerial images and/or videos showing a top-down view of the scene of the collision or crash, the road layout, etc. In various aspects, the camera 210 may include any suitable combination of hardware and/or software such as image sensors, optical stabilizers, image buffers, frame buffers, charge-coupled devices, complementary metal oxide semiconductor devices, etc., to facilitate this functionality. Further, the camera 210 may be coupled to one or more servos that are controlled via the processor 202 to obtain images and/or video from one or more locations. The camera 210 may include any suitable number of cameras, which may include cameras that capture image data in both the visible and the non-visible spectrum, such as digital and thermal imaging cameras, for example.

The display 212 may be configured to display one or more images, messages, instructions, etc., in response to data received from the processor 202. The display 212 may be implemented as any suitable type of display, and may facilitate user interactions with the UAV 200. For example, the display 212 may be implemented as a capacitive touch screen display, a resistive touch screen display, a standard display (a non-touch display), etc. In various aspects, the display 212 may be configured to work in conjunction with the processor 202 to detect user inputs upon a user selecting a displayed interactive icon or other graphic, to identify user selections of objects displayed via the display 212, etc. Additionally or alternatively, information displayed via the display 212 may be in the form of audible announcements made via the speaker/microphone 214.

The memory 216 may be a computer-readable non-transitory storage device that may include any suitable combination of volatile memory (e.g., a random access memory or non-volatile memory). The memory 216 may be configured to store instructions executable on the processor 202, such as the various modules illustrated in FIG. 2 and further discussed below.

The navigation module 218 in the memory 216 may be configured to store instructions that, when executed by the processor 202, cause the processor 202 to control the speed, direction, route, and/or altitude of the UAV 200. For example, executable instructions stored in the navigation module 218 may enable the processor 202 to determine a destination specified as geographic location coordinates received as part of a command via the communication unit 208, to determine a current geographic location of the UAV 200 via the location acquisition unit 206, and/or to execute the appropriate controls to maneuver the UAV 200 to the destination.

In some aspects, navigation of the UAV 200 may be performed with the assistance of one or more individuals controlling the UAV 200. For example, personnel associated with the central monitoring system 106 may use image and/or video captured by the camera 210 as feedback and manually direct the UAV 200. In other aspects, navigation may be performed by the UAV 200 autonomously or semi-autonomously (i.e., with minimal assistance from individuals). For example, executable instructions stored in the navigation module 218 may enable the processor 202 to utilize image and/or video captured by the camera 210 and to analyze the image and/or video in accordance with any suitable image recognition, object recognition, collision-avoidance, detect-and-avoid, and/or machine vision algorithms. The UAV 200 may use the outcome of such analyses to complete a requested navigational task.

The data collection module 220 in the memory 216 may be configured to store instructions that, when executed by the processor 202 to collect data associated with one or more locations in which the UAV 200 is dispatched or otherwise directed. Similar to the navigation processes described above, the UAV 200 may likewise perform data collection processes via manually, autonomously, or semi-autonomously. Data may be collected, for example, via one or more of the sensor array 204, the location acquisition unit 206, and/or the camera 210.

Figure 3:
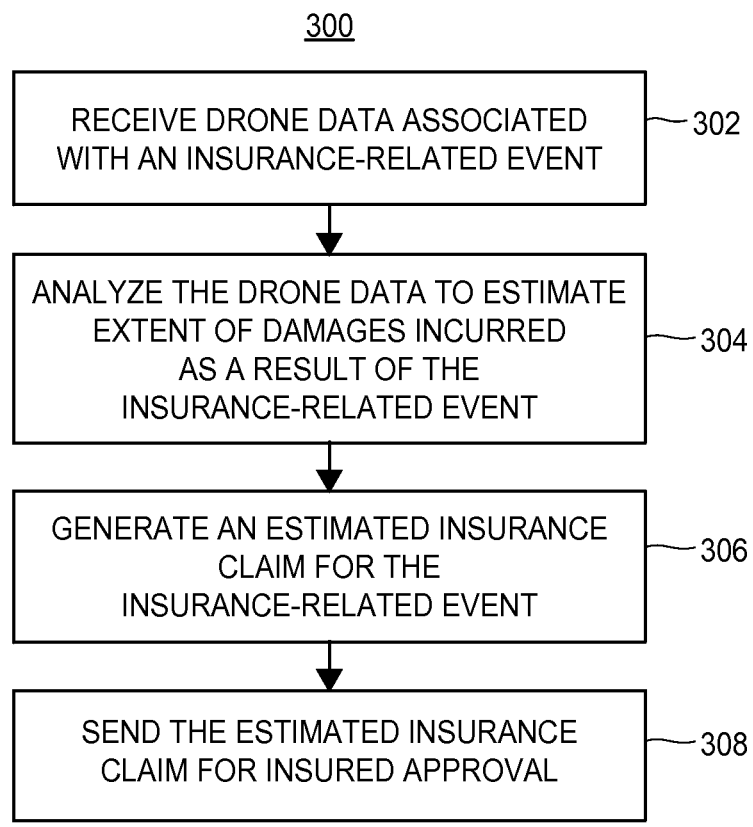
FIG. 3 is a flow diagram of an exemplary method for using data collected from UAVs to pre-generate claims for insured approval.

III. Exemplary Method for Using Data Collected from UAVs to Pre-Generate Claims for Insured Approval FIG. 3 depicts a flow diagram of an exemplary method 300 for using data collected from UAVs to pre-generate claims for insured approval. The method 300 may include one or more blocks, routines or functions in the form of computer executable instructions that are stored in a tangible computer-readable memory (e.g., 108B of FIG. 1) and executed using a processor (e.g., 108A of FIG. 1).

The method 300 may begin by receiving drone data associated with an insurance-related event (block 302). The drone data may be received from one or more UAVs (also called drones), such as the one or more UAVs 104A-104D shown in FIG. 1. The drone data may include image data, video data, audio data, and/or other data related to the insurance-related event. The drone data may be generated, captured, collected, or gathered by the one or more UAVs before, during, and/or after the insurance-related event. The drone data may be collected by the UAVs via one or more sensors, cameras, imaging devices, audio or visual recording devices, and/or other devices that are part of or mounted on the UAVs. The drone data may be received via wireless communication or data transmission, for example.

In general, the insurance-related event may be any event in which damages are incurred on an insured asset. The insured asset may be a vehicle, a home, a real property, and/or other property. As such, damages incurred on the insured asset may be, for example, damages to a vehicle as a result of a collision, crash, or disaster, damages to a home as a result of fire, flood, or theft, damages to a real property as a result of a severe weather occurrence or a natural disaster (e.g., a hurricane, a tornado, an earthquake, etc.), etc.

As an example, the insurance-related event may be a vehicle collision or crash involving an insured driver or vehicle covered by an insurance policy issued by an insurance provider. Accordingly, the receive drone data may include various images, videos, audios, and/or other data collected by the one or more UAVs before, during, and/or after the vehicle collision or crash.

To collect data, the one or more UAVs may first identify vehicles involved at the scene of the vehicle collision or crash. Afterward, the one or more UAVs may capture images, videos, and/or audios of the vehicles involved (e.g., impact points, crash noises, license plate numbers, extent of vehicle damages, etc.). The one or more UAVs may also capture aerial image and/or video data of the scene of the vehicle collision or crash at a predetermined or otherwise established elevation. These aerial image and/or video data may reveal details associated with the scene of the vehicle collision or crash, such as the type of roads, road lighting conditions, current traffic conditions, the time of day, weather conditions, etc. Further, the one or more UAVs may perform interviews with drivers, passengers, witnesses, and/or other persons involved in the vehicle collision or crash. For example, the one or more UAVs may provide prompts and/or instructions, and then record responses to the prompts as audio and/or video data.

Next, the method 300 analyzes the received drone data to estimate the extent of damages incurred as a result of the insurance-related event (block 304). With reference to the vehicle collision or crash example above, the method 300 may analyze any or all of the received drone data to estimate or determine the extent of damages to the vehicle and/or injuries to vehicle occupants (e.g., drivers, passenger, etc.) as a result of the vehicle collision or crash.

The method 300 then generates an estimated insurance claim for the insurance-related event (block 306). Here, the method 300 generates an insurance claim estimate for the insured asset based upon the extent of damages to the insured asset, as determined from the analysis of the drone data in block 304. Continuing with the vehicle collision or crash example, the method 300 may generate an estimated insurance claim for the collision or crash based upon the estimated extent of damages to the vehicle and/or injuries to the vehicle occupants, as determined from the drone data analysis.

The method 300 may also send the estimated insurance claim for insured approval (block 308). In particular, the method 300 may transmit the estimated insurance claim, via wireless communication or data transmission, to a computing device (e.g., the mobile device 102 in FIG. 1) associated with an insured individual or an owner of the insured asset in order to facilitate the process of reviewing, approving, and/or modifying the estimated insurance claim.

This allows for quicker claim handling in the sense that the insured individual may quickly review, approve, and/or modify the estimated insurance claim on his or her mobile or other computing device, and then have his or her insurance policy premium, rate, reward, or discount adjusted or updated based upon the approved estimated insurance claim.

IV. Exemplary Method

In one aspect, a computer-implemented method of using drone data to pre-generate insurance claims may be provided. The method may include (1) receiving, via a network, drone data from one or more UAVs, the drone data including one or more of image data, video data, or audio data associated with an insurance-related event in which damage is incurred on an insured asset; (2) analyzing, by one or more processors, the drone data to estimate an extent of damage incurred on the insured asset; (3) generating, by one or more processors, an estimated insurance claim for the insured asset based upon the estimated extent of damage incurred on the insured asset; and/or (4) transmitting, via a network (such as via wireless communication or data transmission), the estimated insurance claim to a mobile device (or other computing device) an owner of the insured asset for their review and approval of the estimated insurance claim. The method may include additional, fewer, or alternate actions, including those discussed elsewhere herein, and/or may be implemented via one or more local or remote processors, and/or via computer-executable instructions stored on non-transitory computer-readable medium or media.

The method may further include (1) receiving, via a network, approval of or modification to the estimated insurance claim from the owner of the insured asset; and (2) adjusting, by one or more processors, one or more of a premium, a rate, a reward, or a discount for an insurance policy associated with the insured asset based upon the estimated insurance claim.

The insured asset may be a vehicle and the insurance-related event may be a vehicle collision or crash in which damage is incurred on the vehicle. Accordingly, analyzing the drone data to estimate the extent of damage may include estimating damages to the vehicle or injuries to vehicle occupants as a result of the vehicle collision or crash. Further, generating the estimated insurance claim may include generating an estimated insurance claim for the vehicle based upon the estimated damages to the vehicle or injuries to vehicle occupants.

The insured asset may also be one or more of a vehicle, home, real property, or other property. As such, the insurance-related event may be a severe weather condition including one or more of a hurricane, tornado, thunderstorm, windstorm, or hailstorm that causes damage to one or more of the vehicle, home, real property, or other property. The insurance-related event may also be an incident in which one or more of wind damage, water damage, fire damage, theft damage, hail damage, or earthquake damage is incurred on one or more of the vehicle, home, real property, or other property.

V. Exemplary Computer System

In one aspect, a computer system for using drone data to pre-generate insurance claims may be provided. The computer system may include a data repository and a server including a memory having instructions for execution on one or more processors. The instructions, when executed by the one or more processors, may cause the server to receive, via a network, drone data from one or more UAVs, the drone data including one or more of image data, video data, or audio data associated with an insurance-related event in which damage is incurred on an insured asset; store the drone data in the data repository; analyze the drone data in the data repository to estimate an extent of damage incurred on the insured asset; generate an estimated insurance claim for the insured asset based upon the estimated extent of damage incurred on the insured asset; and/or transmit, via a communication network (such as via wireless communication or data transmission), the estimated insurance claim to a mobile or other computing device of an owner of the insured asset for their review and approval of the estimated insurance claim. The computer system may include additional, fewer, or alternate instructions for execution on the one or more processors, including those discussed elsewhere herein.

The instructions, when executed by the one or more processors, may further cause the server to receive, via a network, approval of or modification to the estimated insurance claim from the owner of the insured asset; and/or adjust, by one or more processors, one or more of a premium, a rate, a reward, or a discount for an insurance policy associated with the insured asset based upon the estimated insurance claim.

The insured asset may be a vehicle and the insurance-related event may be a vehicle collision or crash in which damage is incurred on the vehicle. Accordingly, the instructions of the server, when executed by the one or more processors to analyze the drone data to estimate the extent of damage may include instructions to estimate damages to the vehicle or injuries to vehicle occupants as a result of the vehicle collision or crash. Further, the instructions of the server, when executed by the one or more processors to generate the estimated insurance claim may include instructions to generate an estimated insurance claim for the vehicle based upon the estimated damages to the vehicle or injuries to vehicle occupants.

The insured asset may also be one or more of a vehicle, home, real property, or other property. As such, the insurance-related event may be a severe weather condition including one or more of a hurricane, tornado, thunderstorm, windstorm, or hailstorm that causes damage to one or more of the vehicle, home, real property, or other property. The insurance-related event may also be an incident in which one or more of wind damage, water damage, fire damage, theft damage, hail damage, or earthquake damage is incurred on one or more of the vehicle, home, real property, or other property.

VI. Exemplary Non-Transitory Storage Medium

In one aspect, a non-transitory computer-readable storage medium including computer-readable instructions to be executed on one or more processors of a system for using drone data to pre-generate insurance claims may be provided. The instructions when executed may cause the one or more processors to receive, via a network, drone data from one or more UAVs, the drone data including one or more of image data, video data, or audio data associated with an insurance-related event in which damage is incurred on an insured asset; analyze the drone data to estimate an extent of damage incurred on the insured asset; generate an estimated insurance claim for the insured asset based upon the estimated extent of damage incurred on the insured asset; and/or transmit, via a network, the estimated insurance claim to a mobile device (or other computing device) of an owner of the insured asset, such as via wireless communication or data transmission, for their review and approval of the estimated insurance claim. The non-transitory computer-readable storage memory may include additional, fewer, or alternate computer-readable instructions, including those discussed elsewhere herein.

The instructions that, when executed, may further cause the one or more processors to receive, via a network, approval of or modification to the estimated insurance claim from the owner of the insured asset; and/or adjust one or more of a premium, a rate, a reward, or a discount for an insurance policy associated with the insured asset based upon the estimated insurance claim.

The insured asset may be a vehicle and the insurance-related event may be a vehicle collision or crash in which damage is incurred on the vehicle. Accordingly, the instructions to analyze the drone data to estimate the extent of damage may include estimating damages to the vehicle or injuries to vehicle occupants as a result of the vehicle collision or crash. Further, the instructions to generate the estimated insurance claim may include generating an estimated insurance claim for the vehicle based upon the estimated damages to the vehicle or injuries to vehicle occupants.

VII. Exemplary Computing Environment

Figure 4:
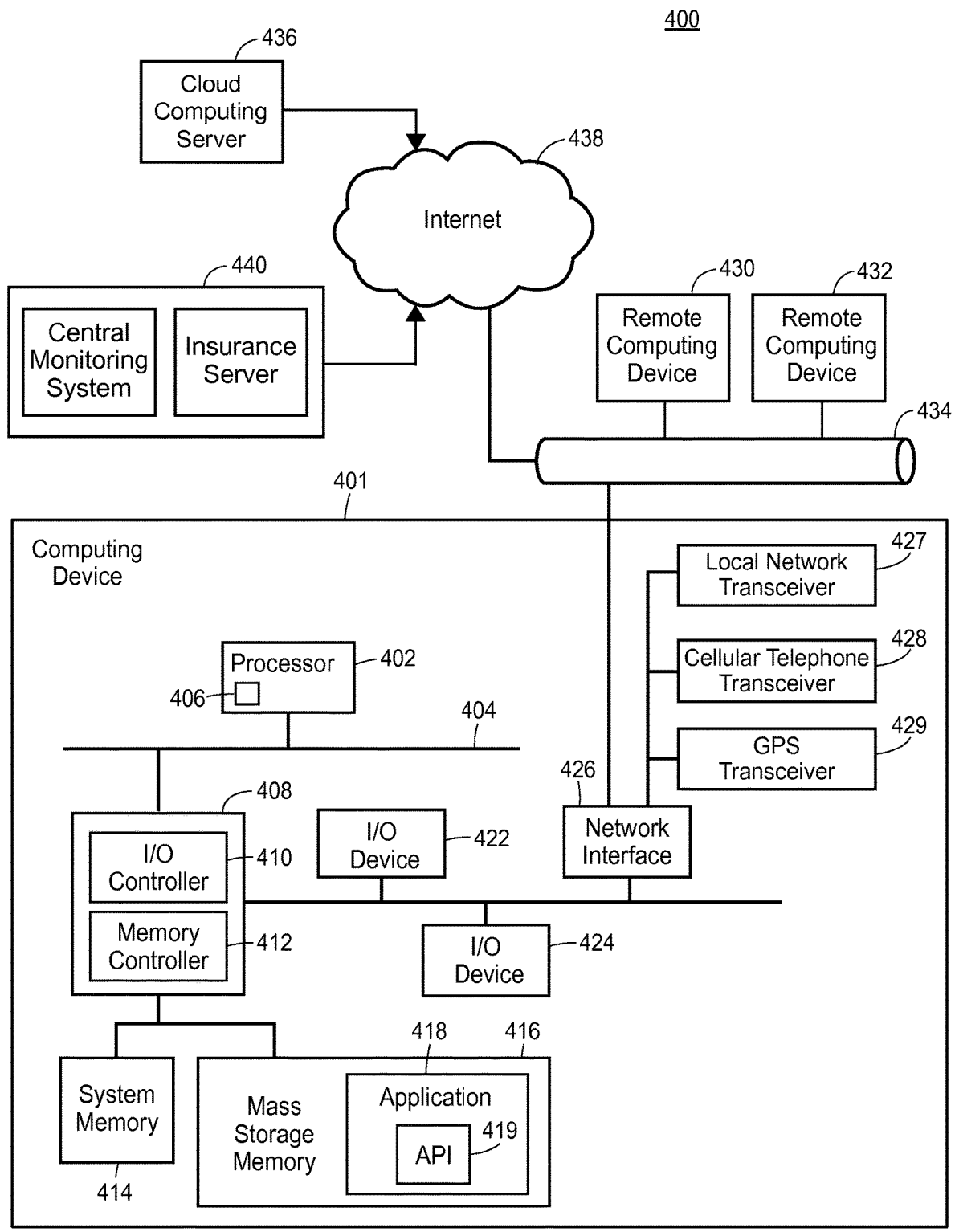
FIG. 4 is a block diagram of an exemplary computing environment that implements a system and method for using data collected from UAVs to pre-generate claims for insured approval.

FIG. 4 is a block diagram of an exemplary computing environment for a system 400 having a computing device 401 that may be used to implement the systems and methods described herein. The computing device 401 may be a computing device (e.g., a smart phone, a tablet computer, a laptop computer, a Wi-Fi-enabled device, etc.), a server, or other types of computing or mobile devices. Processor systems similar or identical to the system 400 may be used to implement and execute the exemplary system of FIG. 1, the exemplary UAV system of FIG. 2, the exemplary method of FIG. 3, and the like. Although the system 400 is described below as including a plurality of peripherals, interfaces, chips, memories, etc., one or more of those elements may be omitted from other exemplary processor systems used to implement and execute the exemplary system 100. Also, other components may be added.

As shown in FIG. 4, the computing device 401 may include a processor 402 that is coupled to an interconnection bus 404. The processor 402 may include a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 may be coupled to a chipset 408, which may include a memory controller 410 and a peripheral input/output (I/O) controller 412. As is well known, a chipset typically provides I/O and memory management functions, as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement an application 418 having an API 419 (including functions and instructions as described by the method 300 of FIG. 3), the mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 400. Thus, a module, block, function, operation, procedure, routine, step, and method may be implemented in hardware, firmware, and/or software. In one embodiment, program modules and routines (e.g., the application 418, the API 419, etc.) are stored in mass storage memory 416, loaded into system memory 414, and executed by a processor 402 or may be provided from computer program products that are stored in tangible computer-readable storage mediums (e.g., RAM, hard disk, optical/magnetic media, etc.).

The peripheral I/O controller 410 may perform functions that enable the processor 402 to communicate with peripheral input/output (I/O) devices 422 and 424, a network interface 426, a local network transceiver 427, a cellular network transceiver 428, and a GPS transceiver 429 via the network interface 426. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 428 may be resident with the local network transceiver 427. The local network transceiver 427 may include support for a Wi-Fi network, Bluetooth, Infrared, or other wireless data transmission protocols.

In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 400 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the application 418 on remote computing devices 430 and 432. The remote computing devices 430 and 432 may communicate with the computing device 401 over an Ethernet link 434. In some embodiments, the application 418 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. In some embodiments, the application 418 may communicate with backend components 440 such as the central monitoring system 106, and the insurance server 108 via the Internet 438.

The system 400 may include, but is not limited to, any combination of a LAN, a MAN, a WAN, a mobile, a wired or wireless network, a private network, or a virtual private network. Moreover, while only two remote computing devices 430 and 432 are illustrated in FIG. 4 to simplify and clarify the description, it is understood that any number of client computers are supported and may be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the Figures depict preferred embodiments of a system and method for using data collected from UAVs to pre-generate claims for insured approval for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for using data collected from UAVs to pre-generate claims for insured approval through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

With the foregoing, an insurance customer may opt into a rewards, insurance discount, or other type of program. After the insurance customer provides their affirmative consent, an insurance provider drone or UAV may collect image data of insured assets after (and/or before) an insurance-related event, including those events discussed elsewhere herein. In return, risk averse drivers, and/or vehicle or home owners may receive discounts or insurance cost savings related to auto, home, and other types of insurance from the insurance provider.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles or homes, and/or (ii) vehicle operators or passengers, or home occupants.

The present embodiments may also facilitate risk assessment and premium determination for vehicle or home insurance policies. For instance, a consumer may opt-in to a rewards program that rewards them, such as in the form of insurance discounts, for sharing data related to their vehicle and/or home features with an insurance provider, both before and after an insurance-related event. Also, more efficient online insurance claim handling and/or processing may be provided, as well as proposed insurance claim pre-generation.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method of using drone data to pre-generate insurance claims, the method comprising:
receiving, by one or more processors, a report of an insurance-related event including a location of an insured asset;
directing, by one or more processors, a plurality of drones to the location of the insured asset to collect drone data in response to receiving the report, including directing a mothership drone to the location of the insured asset which directs one or more other drones to the location;
receiving, via a network, the drone data from the plurality of drones, the drone data including one or more of image data, video data, or audio data associated with the insurance-related event in which damage is incurred on the insured asset; and
analyzing, by one or more processors, the drone data to estimate an extent of damage incurred on the insured asset.

2. The computer-implemented method of claim 1, wherein the insured asset is a vehicle and the insurance-related event is a vehicle collision or crash in which damage is incurred on the vehicle.

3. The computer-implemented method of claim 2, wherein analyzing the drone data to estimate the extent of damage includes estimating damages to the vehicle or injuries to vehicle occupants as a result of the vehicle collision or crash.

4. The computer-implemented method of claim 1, wherein the method further comprises:
generating, by one or more processors, an estimated insurance claim for the insured asset based upon the estimated extent of damage incurred on the insured asset.

5. The computer-implemented method of claim 4, wherein the method further comprises:

transmitting, via a network, the estimated insurance claim to a mobile device of an owner of the insured asset for their review and approval of the estimated insurance claim; and receiving, via a network, approval of or modification to the estimated insurance claim from the owner of the insured asset.

6. The computer-implemented method of claim 1, wherein the insured asset is one or more of a vehicle, home, real property, or other property.

7. The computer-implemented method of claim 6, wherein the insurance-related event is a severe weather condition including one or more of a hurricane, tornado, thunderstorm, windstorm, or hailstorm that causes damage to one or more of the vehicle, home, real property, or other property.

8. The computer-implemented method of claim 6, wherein the insurance-related event is an incident in which one or more of wind damage, water damage, fire damage, theft damage, hail damage, or earthquake damage is incurred on one or more of the vehicle, home, real property, or other property.

9. A non-transitory computer-readable storage medium including computer-readable instructions to be executed on one or more processors of a system for using drone data to pre-generate insurance claims, the instructions when executed causing the one or more processors to:

receive, via a network, a report of an insurance-related event including a location of an insured asset;

direct a plurality of drones to the location of the insured asset to collect drone data in response to receiving the report, including direct a mothership drone to the location of the insured asset which directs one or more other drones to the location;

receive, via the network, the drone data from the plurality of drones, the drone data including one or more of image data, video data, or audio data associated with the insurance-related event in which damage is incurred on the insured asset; and analyze the drone data to estimate an extent of damage incurred on the insured asset.

10. The non-transitory computer-readable storage medium of claim 9, wherein the insured asset is a vehicle and the insurance-related event is a vehicle collision or crash in which damage is incurred on the vehicle.

11. The non-transitory computer-readable storage medium of claim 10, wherein the instructions to analyze the drone data to estimate the extent of damage include estimating damages to the vehicle or injuries to vehicle occupants as a result of the vehicle collision or crash.

12. The non-transitory computer-readable storage medium of claim 11, wherein the instructions cause the one or more processors to generate an estimated insurance claim for the vehicle based upon the estimated damages to the vehicle or injuries to vehicle occupants.

13. A computer system for using drone data to pre-generate insurance claims, the system comprising:

a data repository; and a server, including a memory having instructions for execution on one or more processors, wherein the instructions, when executed by the one or more processors, cause the server to:

receive, via a network, a report of an insurance-related event including a location of an insured asset;

direct a plurality of drones to the location of the insured asset to collect drone data in response to receiving the report, including direct a mothership drone to the location of the insured asset which directs one or more other drones to the location;

receive, via the network, the drone data from the plurality of drones, the drone data including one or more of image data, video data, or audio data associated with the insurance-related event in which damage is incurred on the insured asset;

store the drone data in the data repository; and analyze the drone data in the data repository to estimate an extent of damage incurred on the insured asset.

14. The computer system of claim 13, wherein the insured asset is a vehicle, and the insurance-related event is a vehicle collision or crash in which damage is incurred on the vehicle.

15. The computer system of claim 14, wherein the instructions of the server, when executed by the one or more processors to analyze the drone data to estimate the extent of damage further include instructions to estimate damages to the vehicle or injuries to vehicle occupants as a result of the vehicle collision or crash.

16. The computer system of claim 15, wherein the instructions of the server, when executed by the one or more processors cause the one or more processors to generate an estimated insurance claim for the vehicle based upon the estimated damages to the vehicle or injuries to vehicle occupants.

17. The computer system of claim 13, wherein the insured asset is one or more of a vehicle, home, real property, or other property.

18. The computer system of claim 17, wherein the insurance-related event is a severe weather condition including one or more of a hurricane, tornado, thunderstorm, windstorm, or hailstorm that causes damage to one or more of the vehicle, home, real property, or other property.

19. The computer system of claim 17, wherein the insurance-related event is an incident in which one or more of wind damage, water damage, fire damage, theft damage, hail damage, or earthquake damage is incurred on one or more of the vehicle, home, real property, or other property.

* * * * *